US012753773B2

(12) United States Patent
Hansel et al.

(10) Patent No.: US 12,753,773 B2
(45) Date of Patent: Oct. 6, 2026

(54) AXIAL FAN ASSEMBLY INCLUDING AN INTERMEDIATE SHROUD

(71) Applicant: Regal Beloit America, Inc., Milwaukee, WI (US)

(72) Inventors: Jacob Michael Hansel, New Haven, IN (US); Jeevan Gnana Robinson, Fort Wayne, IN (US); Steven A. Trimble, Cassville, MO (US)

(73) Assignee: REGAL BELOIT AMERICA, INC., Milwaukee, WI (US)

( * ) Notice: Subject to any disclaimer, the term of this patent is extended or adjusted under 35 U.S.C. 154(b) by 0 days.

(21) Appl. No.: 19/325,910

(22) Filed: Sep. 11, 2025

(65) Prior Publication Data

US 2026/0009398 A1 Jan. 8, 2026

Related U.S. Application Data

(62) Division of application No. 18/541,499, filed on Dec. 15, 2023, now abandoned.

(51) Int. Cl.

| | |
|---|---|
| ***F04D 29/32*** | (2006.01) |
| ***F04D 19/00*** | (2006.01) |
| ***F04D 29/38*** | (2006.01) |
| ***F04D 29/66*** | (2006.01) |

(52) U.S. Cl.

CPC ......... *F04D 29/326* (2013.01); *F04D 19/002* (2013.01); *F04D 29/329* (2013.01); *F04D 29/384* (2013.01); *F04D 29/662* (2013.01); *F05D 2240/303* (2013.01); *F05D 2240/304* (2013.01)

(58) Field of Classification Search

None

See application file for complete search history.

(56) References Cited

U.S. PATENT DOCUMENTS

| | | | |
|---|---|---|---|
| 5,275,531 | A | 1/1994 | Roberts |
| 5,342,167 | A | 8/1994 | Rosseau |
| 5,460,488 | A | 10/1995 | Spear et al. |
| 5,478,201 | A | 12/1995 | Amr |
| 5,762,034 | A | 6/1998 | Foss |
| 6,302,650 | B1 | 10/2001 | Williams et al. |
| 6,309,176 | B1 | 10/2001 | Periyathamby et al. |
| 7,484,925 | B2 | 2/2009 | Carlson et al. |
| 8,182,228 | B2 | 5/2012 | Riley et al. |
| 8,317,478 | B2 | 11/2012 | Higo et al. |
| 8,622,695 | B2 | 1/2014 | Decker et al. |
| 9,506,353 | B2 | 11/2016 | Schwarz et al. |
| 9,885,368 | B2 | 2/2018 | Dygert et al. |
| 10,054,131 | B2 | 8/2018 | Aynsley et al. |
| 10,190,601 | B2 | 1/2019 | Dygert et al. |
| 10,465,700 | B2 | 11/2019 | Hioki |

(Continued)

*Primary Examiner* — Juan G Flores

(74) *Attorney, Agent, or Firm* — Armstrong Teasdale LLP

(57) ABSTRACT

An axial fan assembly includes a hub and one or more blades extending radially from a center point of the hub about which the axial fan rotates relative to an axis of rotation. Each of the one or more blades extending a blade length from the hub to a free edge of the one or more blades. The axial fan assembly also includes an intermediate shroud arranged radially outwards of the hub and radially inwards of the free edge of the one or more blades. The intermediate shroud including a first shroud end, and a second shroud end laterally opposite the first shroud end. Wherein the intermediate shroud has a circumferential sinusoidal shape.

20 Claims, 7 Drawing Sheets

(56) References Cited

U.S. PATENT DOCUMENTS

| | | | |
|---|---|---|---|
| 10,619,483 | B2 | 4/2020 | Voytovych et al. |
| 10,731,881 | B2 | 8/2020 | Amr et al. |
| 11,168,899 | B2 | 11/2021 | Dygert |
| 11,293,289 | B2 | 4/2022 | Griffin et al. |
| 11,313,249 | B2 | 4/2022 | Ishida et al. |
| 11,555,508 | B2 | 1/2023 | Robinson et al. |
| 2008/0056899 | A1 | 3/2008 | Jiang et al. |
| 2009/0220334 | A1 | 9/2009 | Vouche |
| 2010/0086405 | A1 | 4/2010 | Higo et al. |
| 2012/0324901 | A1 | 12/2012 | Allam |
| 2014/0026833 | A1 | 1/2014 | Jensen et al. |
| 2015/0354841 | A1 | 12/2015 | Amr et al. |
| 2019/0226688 | A1 | 7/2019 | Dygert et al. |

AXIAL FAN ASSEMBLY INCLUDING AN INTERMEDIATE SHROUD

CROSS-REFERENCE TO RELATED APPLICATIONS

This application is a divisional application of and claims priority to U.S. patent application Ser. No. 18/541,499, filed Dec. 15, 2023, which is hereby incorporated by reference in its entirety.

FIELD

The embodiments described herein relate generally to axial fans, and more particularly, to an axial fan assembly including an axial fan comprising one or more blades and an intermediate shroud positioned proximate to a blade tip of the one or more blades.

BACKGROUND

At least some known axial fan assemblies include an axial fan with one or more blades designed to improve performance of the axial fan assembly. For example, the one or more blades may be designed to have a minimum blade thickness and/or to have complex curves to facilitate improved performance of the axial fan. However, blades that have a minimized thickness and/or have complex curves may be more prone to blade flexure, and/or blade tip fluttering, due to the significant size of the blades and the vibration that results from operation of the axial fan assembly.

Therefore, there is a need for an axial fan assembly that includes an axial fan with one or more blades and an intermediate shroud proximate to a blade tip of the one or more blades to facilitate damping vibration, reducing friction, and improving airflow.

BRIEF DESCRIPTION

In one aspect, an axial fan assembly includes a hub and one or more blades extending radially from a center point of the hub about which the axial fan rotates relative to an axis of rotation. Each of the one or more blades extending a blade length from the hub to a free edge of the one or more blades. The axial fan assembly also includes an intermediate shroud arranged radially outwards of the hub and radially inwards of the free edge of the one or more blades. The intermediate shroud including a first shroud end, and a second shroud end laterally opposite the first shroud end. Wherein the intermediate shroud has a circumferential sinusoidal shape.

In another aspect, a method of fabricating an axial fan assembly includes providing an axial fan comprising a hub and one or more blades extending radially from a center point of the hub about which the axial fan rotates relative to an axis of rotation. Each of the one or more blades extending a blade length from the hub to a free edge of the one or more blades. The method also includes arranging an intermediate shroud radially outwards of the hub and radially inwards of the free edge of the one or more blades. The intermediate shroud including a first shroud end, and a second shroud end laterally opposite the first shroud end. Wherein the intermediate shroud has a circumferential sinusoidal shape.

DETAILED DESCRIPTION

An axial fan assembly including an axial fan with one or more blades and an intermediate shroud proximate to a blade tip of the one or more blades is provided according to various embodiments of the present disclosure.

Figure 1:
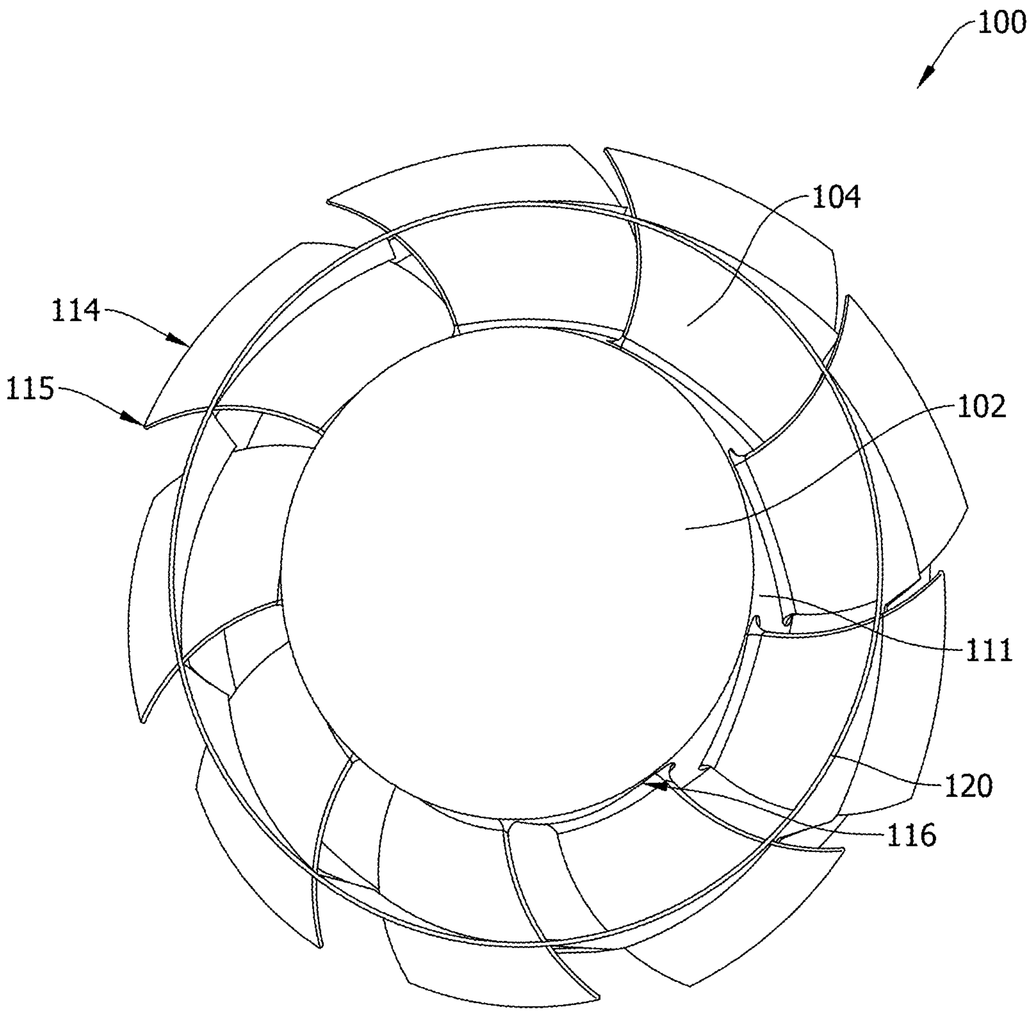
FIG. 1 illustrates a front perspective view of an axial fan assembly in accordance with one or more embodiments of the present disclosure.

FIG. 1 illustrates a front perspective view of an axial fan assembly 100 in accordance with one or more embodiments of the present disclosure. The axial fan assembly 100 includes a hub 102 and one or more blades 104 extending radially from, and circumferentially around, the hub 102. The hub 102 includes a first end 106, a second end 108, and an axis of rotation 110 that extends laterally through the opposed first and second ends 106 and 108 respectively (shown in FIG. 2). Additionally, the hub 102 includes a sidewall 111 extending from the first end 106 to the second end 108. The hub may be assembled to one or more components, such as, but not limited to, components of an airflow system, by flanging, welding, fastening, and/or by interference fits where applicable. A center 112 of the hub 102 is aligned with the axis of rotation 110 (shown in FIG. 2).

Each of the one or more blades 104 includes a free edge 114 defining an outermost edge of the blade 104 as measured from the center 112 of the hub 102, with a blade tip 115 defined along the free edge 114 defining an outermost end of the blade 104 as measured from the center 112 of the hub 102. Additionally, each of the one or more blades 104 includes a coupled end 116 joined to the sidewall 111 of the hub 102. In some embodiments, the sidewall 111 may extend substantially parallel to the axis of rotation 110. In other embodiments, the sidewall 111 may extend at an angle from the axis of rotation 110. The shape of the one or more blades 104 may be any suitable shape that enables the axial fan assembly 100 to function as described herein. Additionally, the shape of the free edge 114 of the one or more blades 104 may be any suitable shape that enables the axial fan assembly 100 to function as described herein.

Figure 2:
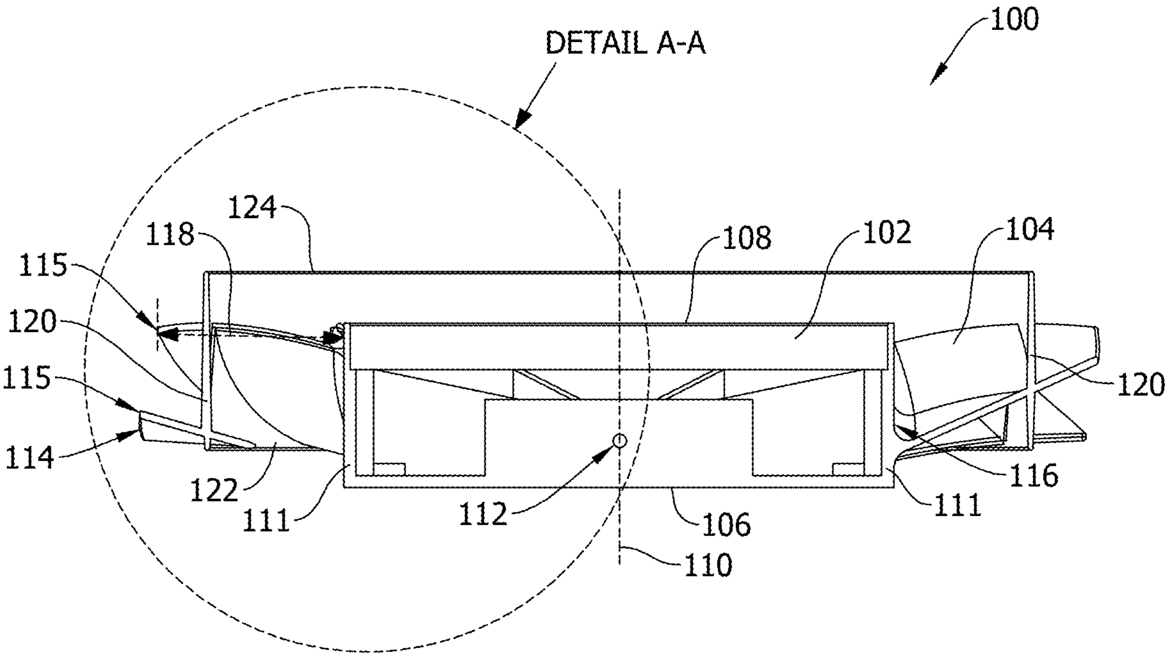
FIG. 2 illustrates a side cross-sectional view of the axial fan assembly shown in FIG. 1.

The one or more blades 104 extend a blade length 118, measured radially from the sidewall 111 of the hub 102 (shown in FIG. 2). During operation of the axial fan assembly 100, the blade length 118 may contribute to flexure of the one or more blades 104 and/or fluttering of the free edge 114 and/or the blade tip 115 of the one or more blades 104. For example, the significant size of the one or more blades 104 and/or the vibration that results from operation of the axial fan assembly 100 may result in decreased stability of the one or more blades 104. Thus, the axial fan assembly 100 also includes an intermediate shroud 120 proximate the free edge 114 of the one or more blades to facilitate improved stability, improved airflow production, reduced blade flutter, and/or improved fatigue life. The blade length 118 may be in a range of from about 2.5 inches (0.0635 meters) to about 5.5 inches (0.1397 meters).

Figure 3:
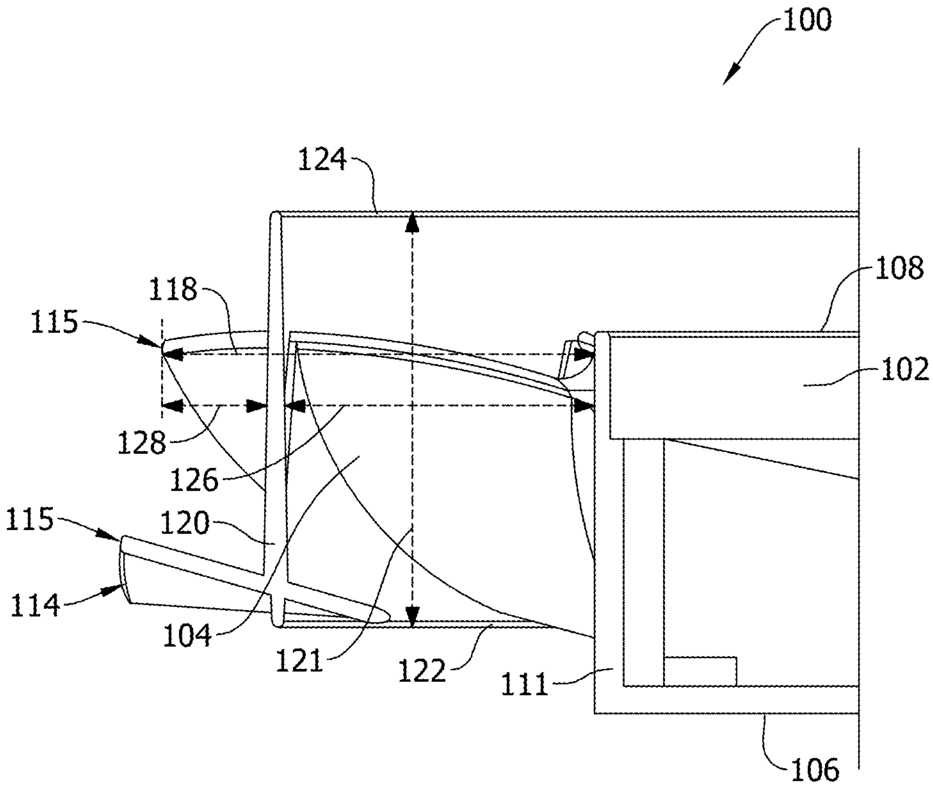
FIG. 3 illustrates an enlarged view of Detail A-A of the axial fan assembly shown in FIG. 2.

FIG. 2 illustrates a side cross-sectional view of the axial fan assembly 100, and FIG. 3 illustrates an enlarged view of the axial fan assembly 100. The intermediate shroud 120 has a circumferential shape and is endless. The intermediate shroud 120 is radially offset from hub 102. The radial offset between the hub 102 and the intermediate shroud 120 is substantially constant along the shroud. The intermediate shroud 120 has a lateral dimension 121 measured between a first shroud end 122 and a second shroud end 124. In some embodiments, the intermediate shroud 120 may extend substantially parallel to the axis of rotation 110 and/or the sidewall 111 of the hub 102. In other embodiments, the intermediate shroud 120 may extend at an angle from the axis of rotation 110 and/or the sidewall 111 of the hub 102.

The intermediate shroud 120 may be a distance 126 measured between the intermediate shroud 120 and the sidewall 111 of the hub 102. The distance 126 between the intermediate shroud 120 and the sidewall 111 may be in a range of from about 60% of the distance from the sidewall 111 to the blade tip 115 to about 90% of the distance from the sidewall 111 to the blade tip 115.

Additionally, the intermediate shroud 120 may be located proximate blade tip 115. The blade tip 115 and the intermediate shroud 120 may be separated by a distance 128, from the blade tip 115 of the one or more blades 104. The distance 128 between the intermediate shroud 120 and the blade tip 115 may be in a range of from about 10% of the distance from the sidewall 111 to the blade tip 115 to about 40% of the distance from the sidewall 111 to the blade tip 115.

The intermediate shroud 120 being positioned proximate the free edge 114, and/or the blade tip 115, of the one or more blades 104, such as with the distance 128 between the intermediate shroud 120 and the blade tip 115, may facilitate improved efficiency and/or production of the axial fan assembly 100. For example, the intermediate shroud 120 may increase the stability of the one or more blades 104 by adding structural support along the blade length 118 of the blades 104. Thus, as a result of the increased stability of the blades 104, the intermediate shroud 120 may facilitate an increase in the flow rate achieved by the operation of the axial fan assembly 100 and/or an increase in the smoothness of the airflow produced by the axial fan assembly 100.

Figure 4:
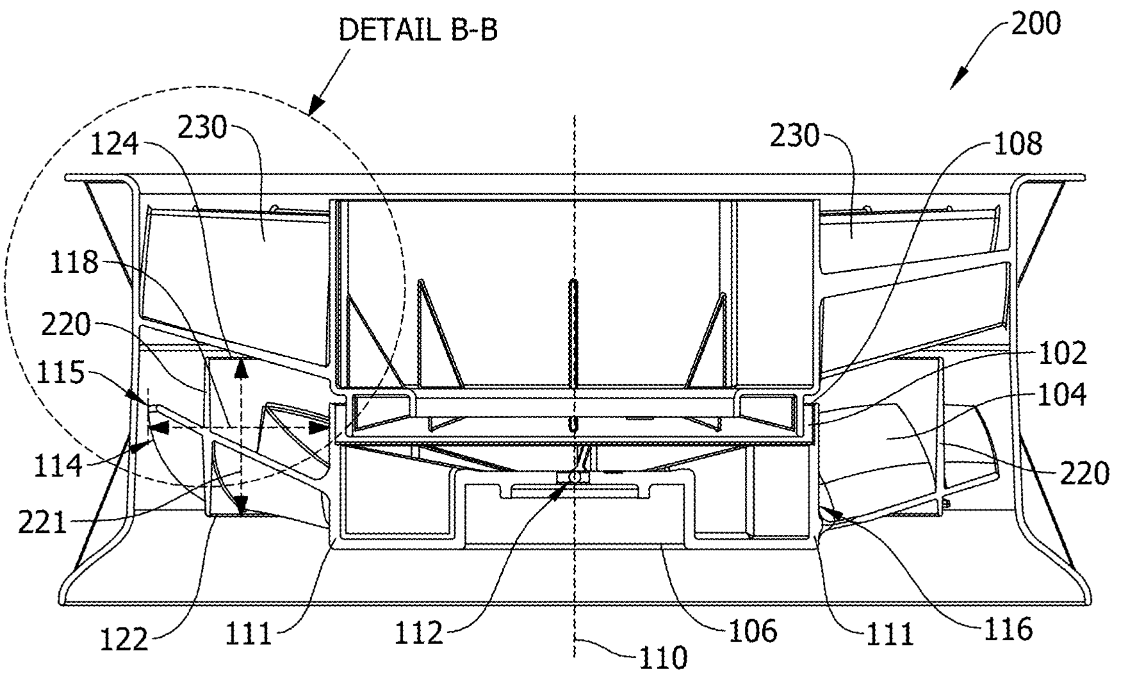
FIG. 4 illustrates a side cross-sectional view of another embodiment of an axial fan assembly.
Figure 5:
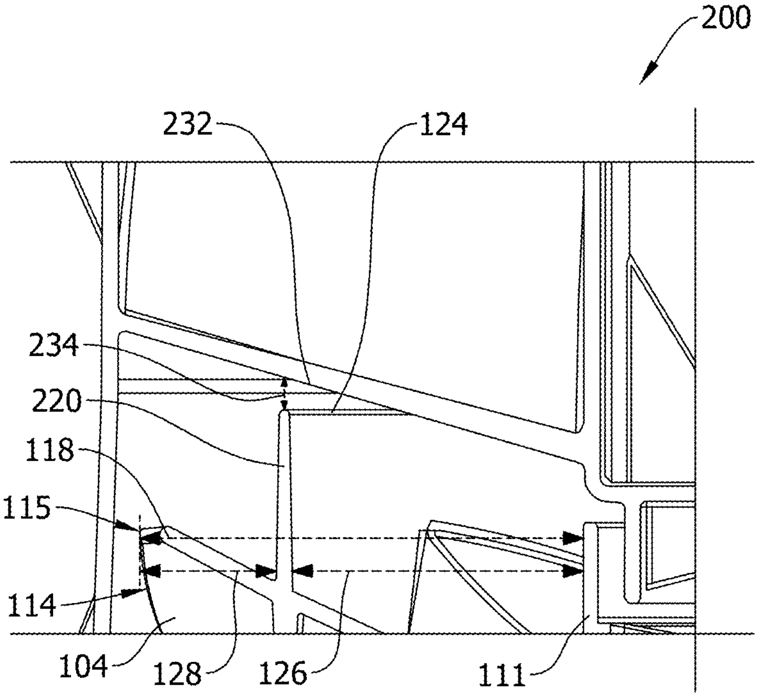
FIG. 5 illustrates an enlarged view of Detail B-B of the axial fan assembly shown in FIG. 4.

FIG. 4 illustrates a side cross-sectional view of an axial fan assembly 200, and FIG. 5 illustrates an enlarged view of the axial fan assembly 200. The axial fan assembly 200 illustrated in FIG. 4 is similar to the axial fan assembly 100 (shown in FIG. 2), with the differences noted below, and as such, the same reference numbers for the same components are used in FIG. 4 as were used in FIG. 2. The axial fan assembly 200 includes an intermediate shroud 220. The intermediate shroud 220 is substantially similar to the intermediate shroud 120 (shown in FIG. 2), in that the intermediate shroud 220 has a circumferential shape, is endless, and is positioned with a substantially constant radial offset along the hub 102.

The intermediate shroud 220 has a lateral dimension 221 measured between a first shroud end 122 and a second shroud end 124. The lateral dimension 221 may be such that the intermediate shroud 220 extends through a leading edge and a trailing edge of the blade 104. For example, the lateral dimension 221 may extend up to 0.5 inches (0.0127 meters) beyond the leading edge of the blade 104. Additionally, for example, the lateral dimension 221 may extend up to 1.5 inches (0.0381 meters) beyond the trailing edge of the blade 104.

The axial fan assembly 200 may be used in conjunction with a plurality of vanes 230 downstream of the one or more blades 104. Each of the plurality of vanes 230 includes a vane leading edge 232 (shown in FIG. 5). The second shroud end 124 of the intermediate shroud 220 may be separated by a gap 234 from the vane leading edge 232 of the plurality of vanes 230. That is, the lateral dimension 221 of the intermediate shroud 220 may be such that the second shroud end 124 of the intermediate shroud 220 is separated by the vane leading edge 232 of the plurality of vanes 230 by the gap 234. The gap 234 between the second shroud end 124 of the intermediate shroud 220 and the vane leading edge 232 of the plurality of vanes 230 may be in a range of from about 0.05 inches (0.00127 meters) to about 1 inch (0.0254 meters). In some embodiments, at least one of the first shroud end 122 and/or the second shroud end 124 may be aerodynamic in shape to help facilitate smooth airflow between the axial fan assembly 200 and the plurality of vanes 230. For example, at least one of the first shroud end 122 and/or the second shroud end 124 may have an elliptical shape with a height to width radius ratio between 1:1 and 4:1.

Figure 6:
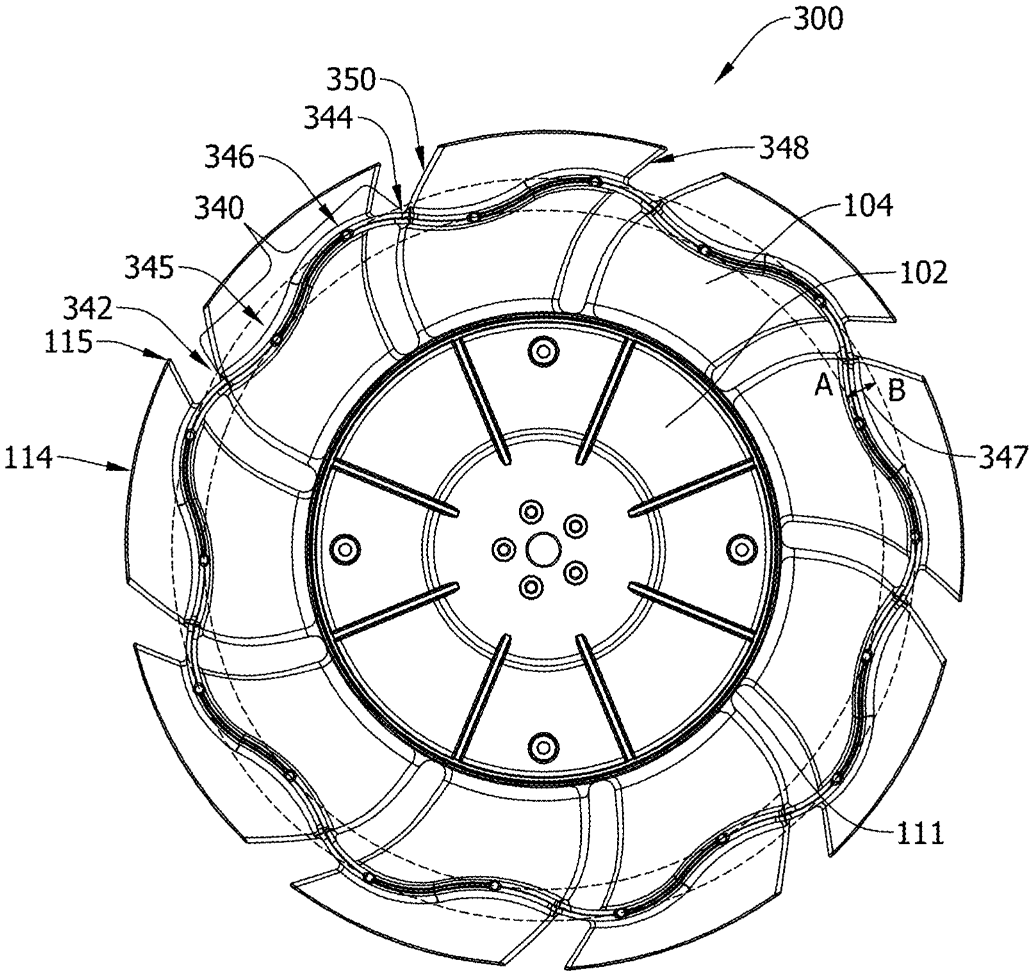
FIG. 6 illustrates a front view of an axial fan assembly in accordance with another embodiment of the present disclosure.

FIG. 6 illustrates a front view of an axial fan assembly 300. The axial fan assembly 300 illustrated in FIG. 6 is similar to the axial fan assembly 100 (shown in FIG. 2) and the axial fan assembly 200 (shown in FIG. 4), with the differences noted below, and as such, the same reference numbers for the same components are used in FIG. 6 as were used in FIG. 2 and FIG. 4. The axial fan assembly 300 includes an intermediate shroud 320. The intermediate shroud 320 is similar to the intermediate shroud 120 (shown in FIG. 2) and the intermediate shroud 220 (shown in FIG. 4), in that the intermediate shroud 320 is endless and is positioned at a radial offset along the hub 102.

The intermediate shroud 320 has a circumferential sinusoidal shape including one or more waves 340. The varying shape of the waves 340 is such that the radial offset of the intermediate shroud 320 along the hub 102 is not continuous. That is, each wave 340 includes a wave start 342 and a wave end 344, with the radial offset along the hub 102 of each of the waves 340 varying between the wave start 342 and the wave end 344. The radial offset decreases from the wave start 342 to a wave trough 345, increases from the wave trough 345 to a wave crest 346, and decreases from the wave crest 346 to the wave end 344. A wave height 347 as measured between the radial offset along the hub 102 at the wave trough 345 (circle A shown in FIG. 6) and the radial offset along the hub at the wave crest 346 (circle B shown in FIG. 6) may vary from 0.3 inches (0.00762 meters) to 1 inch (0.0254 meters).

The sinusoidal shape of the intermediate shroud 320 as formed by the one or more waves 340 facilitates reduced sound from the axial fan assembly 300, such as harmonic tone and/or blade pass tone. In some embodiments, as illustrated in FIG. 6, each wave 340 may be between a leading edge 348 of adjacent blades 104. In other embodiments, each wave 340 may be between a trailing edge 350 of adjacent blades 104. In still other embodiments, the wave start 342 of each wave 340 may be between any point of adjacent blades 104 with a separation of a central angle. The central angle is defined as the number of degrees in a circle divided by the number of blades. The number of waves 340 included in the central angle may range from a minimum of one to a maximum of three. In some embodiments, a midpoint of the wave 340 may be half the arc length and/or half the central angle of the wave. In other embodiments, the midpoint of the wave 340 may not be half the arc length and/or half the central angle of the full wave, such that one half of the wave 340 has a longer arc length than the other half.

Figure 7:
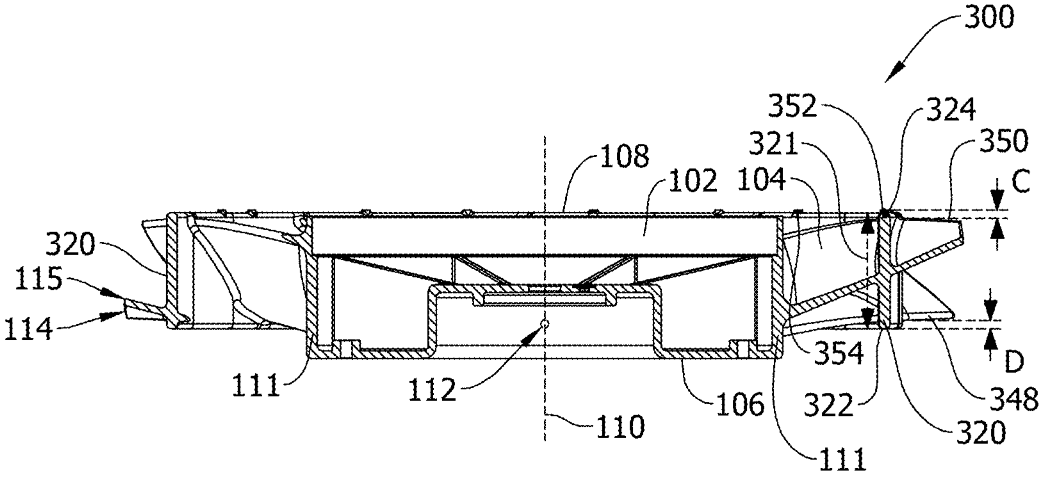
FIG. 7 illustrates a side cross-sectional view of the axial fan assembly shown in FIG. 6.

FIG. 7 illustrates a side cross-sectional view of the axial fan assembly 300. The intermediate shroud 320 has a lateral dimension 321 measured between the first shroud end 322 and the second shroud end 324. The lateral dimension 321 may be such that the intermediate shroud 320 extends through the leading edge 348 and the trailing edge 350 of the blade 104. For example, the lateral dimension 321 may extend up to 0.5 inches (0.0127 meters) beyond the leading edge 348 of the blade 104 (shown as distance D in FIG. 7). Additionally, for example, the lateral dimension 321 may extend up to 1.5 inches (0.0381 meters) beyond the trailing edge 350 of the blade 104 (shown as distance C in FIG. 7).

The intermediate shroud 320 may include one or more balancing features to facilitate improved balance of the axial fan assembly 300. For example, the intermediate shroud may include one or more slots 352 in the second shroud end 324. In some embodiments, the number of slots 352 may be equal to the number of blades 104. In other embodiments, the number of slots 352 may be a multiple of the number of blades 104. Material may be deposited into the one or more slots 352 to balance the axial fan assembly 300 to facilitate reduced impact to the airstream and airflow proximate the blades 104, as compared to adding material to one or more edges of the blades 104. Additionally, less material may be required to be added to balance the axial fan assembly 300 when added to the intermediate shroud 320, as compared to closer to the center mass point of the axial fan assembly 300. Although the slots 352 are illustrated as part of the axial fan assembly 300, the slots 352 may be added to the intermediate shroud of the axial fan assembly 100 (e.g., the intermediate shroud 120) and/or the axial fan assembly 200 (e.g., the intermediate shroud 220).

Additionally, for example, the intermediate shroud 320 may include one or more bosses 354 in the second shroud end 324. In some embodiments, the number of bosses 354 may be equal to the number of blades 104. In other embodiments, the number of bosses 354 may be a multiple of the number of blades 104. The bosses 354 may provide an area for material removal, such as by drilling, to reduce the mass in a certain area to balance the axial fan assembly 300. Less material may be required to be removed to balance the axial fan assembly 300 when removed from the intermediate shroud 320, as compared to closer to the center mass point of the axial fan assembly 300. Although the bosses 354 are illustrated as part of the axial fan assembly 300, the bosses 354 may be included in the intermediate shroud of the axial fan assembly 100 (e.g., the intermediate shroud 120) and/or the axial fan assembly 200 (e.g., the intermediate shroud 220).

Further, for example, material may be added to and/or removed from the intermediate shroud 320 during the molding/casting process. In some embodiments, the intermediate shroud 320 may be formed using injection molding, including adjustable cores in the mold to adjust the amount of material injected into specific areas to facilitate improved balance of the axial fan assembly 300. Material may be added or removed during the molding/casting process from the intermediate shroud of the axial fan assembly 100 (e.g., the intermediate shroud 120) and/or the axial fan assembly 200 (e.g., the intermediate shroud 220).

A technical effect of the system described herein includes at least one of: (a) improved stability of one or more blades of an axial fan; (b) increased flow rate achieved by operation of the axial fan; (c) increased smoothness of airflow produced by the axial fan; (d) decreased sound produced by the axial fan assembly; (e) improved balance of the axial fan assembly; (f) reduced blade flutter of the axial fan; and (g) increased duration of fatigue life of the axial fan assembly.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

The systems and methods described herein are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An axial fan assembly comprising:

an axial fan comprising a hub and one or more blades extending radially from a center point of the hub about which the axial fan rotates relative to an axis of rotation, each of the one or more blades extending a blade length from the hub to a free edge of the one or more blades; and an intermediate shroud arranged radially outwards of the hub and radially inwards of the free edge of the one or more blades, the intermediate shroud including:

a first shroud end, and a second shroud end laterally opposite the first shroud end, wherein the intermediate shroud has a circumferential sinusoidal shape.

2. The axial fan assembly of claim 1, further comprising a plurality of vanes downstream of the one or more blades of the axial fan, each of the plurality of vanes comprising a leading edge, wherein the second end of the intermediate shroud extends laterally toward the leading edge of the plurality of vanes.

3. The axial fan assembly of claim 2, wherein the second end of the intermediate shroud is separated from the leading edge of the plurality of vanes by a gap substantially equal to or more than 0.05 inches.

4. The axial fan assembly of claim 3, wherein the gap is substantially equal to or less than 1 inch.

5. The axial fan assembly of claim 1, wherein the free edge of the one or more blades comprises a blade tip defining an outermost end of the one or more blades.

6. The axial fan assembly of claim 5, wherein the second shroud end of the intermediate shroud extends laterally beyond the blade tip of the one or more blades.

7. The axial fan assembly of claim 1, wherein the circumferential sinusoidal shape is formed by one or more waves.

8. The axial fan assembly of claim 7, wherein each of the one or more waves includes a wave start and a wave end, wherein a radial offset along the hub of each of the waves varies between the wave start and the wave end.

9. The axial fan assembly of claim 8, wherein the radial offset:

decreases from the wave start to a wave trough, increases from the wave trough to a wave crest, decreases from the wave crest to the wave end.

10. The axial fan assembly of claim 9, wherein a wave height, as measured between the radial offset along the hub at the wave trough and the radial offset along the hub at the wave crest is between 0.3 inches to 1.0 inch.

11. The axial fan assembly of claim 9, wherein each wave of the one or more waves extends between a leading edge of adjacent blades.

12. The axial fan assembly of claim 1, wherein the intermediate shroud extends through a leading edge of the one or more blades of the axial fan by a lateral distance of up to 0.5 inches past the leading edge.

13. The axial fan assembly of claim 1, wherein the intermediate shroud extends through a trailing edge of the one or more blades of the axial fan by a lateral distance of up to 1.5 inches past the trailing edge.

14. The axial fan assembly of claim 1, wherein at least one end of the intermediate shroud has an elliptical shape.

15. The axial fan assembly of claim 1, wherein the intermediate shroud further includes one or more slots formed in the second shroud end and configured to receive a material to facilitate improved balance of the axial fan assembly.

16. The axial fan assembly of claim 1, wherein the intermediate shroud further includes one or more bosses formed in the second shroud end.

17. A method of fabricating an axial fan assembly, the method comprising:

providing an axial fan comprising a hub and one or more blades extending radially from a center point of the hub about which the axial fan rotates relative to an axis of rotation, each of the one or more blades extending a blade length from the hub to a free edge of the one or more blades; and arranging an intermediate shroud radially outwards of the hub and radially inwards of the free edge of the one or more blades, the intermediate shroud including:

a first shroud end, and a second shroud end laterally opposite the first shroud end, wherein the intermediate shroud has a circumferential sinusoidal shape.

18. The method of claim 17, further comprising providing a plurality of vanes downstream of the one or more blades, each vane of the plurality of vanes comprising a leading edge, wherein arranging the intermediate shroud comprises positioning the second end of the intermediate shroud to extend laterally toward the leading edge of the plurality of vanes.

19. The method of claim 18, wherein arranging the intermediate shroud comprises positioning the second end of the intermediate shroud a gap from the leading edge of the plurality of vanes, the gap being at least one of substantially equal to 0.05 inches, between 0.05 inches and 1 inch, or substantially equal to 1 inch.

20. The method of claim 17, wherein the free edge of the one or more blades comprises a blade tip defining an outermost end of the one or more blades, and wherein arranging the intermediate shroud comprises positioning the intermediate shroud where the second shroud end extends laterally beyond the blade tip of the one or more blades.

* * * * *